US005127774A

United States Patent [19]

Telford, III

[11] Patent Number: 5,127,774

[45] Date of Patent: Jul. 7, 1992

[54] TOOL BIT FOR CLEANING THE BOTTOM OF A DADO CHANNEL

[76] Inventor: Joseph C. Telford, III, 4909 Woodstone, #2102, San Antonio, Tex. 78230

[21] Appl. No.: 818,547

[22] Filed: Jan. 9, 1992

Related U.S. Application Data

[63] Continuation of Ser. No. 728,660, Jul. 11, 1991.

[51] Int. Cl.[5] .......................... B23C 5/10; B27G 13/14

[52] U.S. Cl. ...................................... 407/34; 144/219; 144/241; 407/54

[58] Field of Search ........................ 407/34, 54, 56, 53; 408/203.5, 204, 205, 211, 212, 228; 144/136 R, 218, 219, 240, 241; D15/139

[56] References Cited

U.S. PATENT DOCUMENTS

| | | | |
|---|---|---|---|
| 1,632,440 | 6/1927 | Follett et al. | 144/136 R |
| 3,656,521 | 4/1972 | Czerniewicz | 408/228 X |
| 4,412,571 | 11/1983 | Czerniewicz | 144/219 |

*Primary Examiner*—Steven C. Bishop

*Attorney, Agent, or Firm*—Gunn, Lee & Miller

[57] ABSTRACT

A specialized, solid, cylindrical tool bit for cleaning uneven surface material from the bottom or floor of a dado channel previously cut in a workpiece. The bit operates at rotation speeds in excess of 10,000 revolutions per minute and has a cutting member having a cutting edge along only the bottom of the cutting member. The cutting edge has four cutting teeth spaced equidistant from each other and circumferentially close to an axis of rotation of the bit. The teeth and body member cooperate to dissipate the heat generated by the high speed rotation of the bit during the cleaning operation of the bit. The entire outer circumferential surface of the cutting member presents no cutting edge for engagement with the side walls of the channel cut in the workpiece. This tool bit performs the task of creating a perfectly flat plane on the bottom surface or floor of the dado channel. This function effects the advantage of promoting perfect dimensional symmetry throughout a finished casegood product assembled with dado joinery. The tool bit provides an advanced design in which the detailed concept of this process of accurizing a pre-manufactured dado channel complies with the mandatory demands of the industry, to perfect accuracy without extensive alteration of present joint manufacturing procedures.

6 Claims, 5 Drawing Sheets

TOOL BIT FOR CLEANING THE BOTTOM OF A DADO CHANNEL

BACKGROUND OF THE INVENTION

This is a continuation-in-part of U.S. patent application Ser. No. 07/728,660 filed Jul. 11, 1991.

The present invention relates to a tool bit, and more particularly to a specialized bit for cleaning uneven surface material from the bottom of a dado channel cut in a workpiece.

The dado cut is used in the production of furniture to provide a means for perpendicularly adjoining two separate members. It is a well known joint cut in the furniture construction industry. Typically the cut is accomplished by means of a dado cutting blade set, known as a "Dado Stack", mounted in a table saw or on a radial-arm saw. The workpiece is moved against the fence and the blade of the radial-arm saw is drawn across the workpiece. This "Dado Stack" cuts a channel or slot in the workpiece. In the radial-arm saw the distance the blade can be drawn across the workpiece is very limited.

The table saw method of dado cutting is generally employed as the mainstay of all cabinet and furniture production because of the length of the dado channel cut which may be obtained.

With the table saw method complications result as the workpiece is pushed or fed against the fence and over the dado set. The forward motion of the workpiece creates a resistance between the surface of the workpiece and the dado blade set. This resistance results in the workpiece lifting at intervals along the dado channel being cut. This lifting or rising action is created by the bombarding of the blades of the dado set against the surface of the workpiece. This creates a serpentine floor elevation in the dado channel.

The router was adopted as an alternative for creating an accurate cut. This accuracy is due to the high revolutions per minute (rpm) developed by the router. The use of high rpm in excess of 10,000 rpm is the only known way of removing the amount of material necessary to produce the dado joint with a cutter blade the width of the finished dado channel. However, two problems exist with this router method of producing a dado joint. The first problem is that router guides must be secured to the workpiece in a precise location to guarantee that every dado joint is cut in the anticipated location. This problem has been overcome by the invention of a device known as the "over-arm router". Such machines work accurately and can even be computer assisted. These machines are extremely expensive. Further, as a result of another problem, the "over-arm router" devices are not cost effective for dado joint manufacture.

The second problem with the router method of producing a dado joint is that the carbide blades designed to cut dado joints in a workpiece with a router, any router, dull very quickly. When they are sharpened, the parallel blades become too narrow to construct a dado wide enough to accept the pre-planned crossmember.

When the inaccuracies of the dado joint are projected throughout the assembly of a casegood item, time consuming and expensive compensations must be made to insure a saleable casegood product.

In the assembly of furniture, an uneven floor in a dado joint will result in a misalignment so significant that the side pieces joined by the dado joints are not parallel. This slows down the entire production of the casegood product The furniture industry has ignored this unevenness in the floor of a dado because it has been impractical until the development of the present invention to create an even surface economically.

The tool related industry has developed other methods to achieve even dado surfaces, but these methods, however, are not cost effective when applied in production.

Most of the methods and devices attempting to solve existing problems and effect an accurate dado joint are based on a one-step process. These one-step processes use complicated guide systems to insure accurate placement of the dado channel. Again, this creates slow production resulting in higher costs.

However, a factor which makes existing two-step methods impractical is that existing apparatuses used in the second step operate at very low rpm. Considering that a very high blade-to-material ratio must be achieved in order to remove enough material efficiently and to produce an accurate cut, existing devices operating at low rpm have been technologically impractical to date.

The only reasonable solution for the industry is to continue to produce the initial dado channel using existing manufacturing techniques and then to have an inexpensive way to even the dado floor. The present inventive bit provides the apparatus for accomplishing this step, without totally abandoning the present manufacturing practices.

U.S. Pat. No. 1,632,440 discloses a simple clean-out router bit for use in the woodworking industry which was designed to eliminate the hand labor involved in cleaning out openings cut by hollow mortising chisels. When using hollow mortising chisels in the construction of wooden furniture, the bottom of the groove remains rough and uneven and small corners hang in the openings. The router bit of U.S. Pat. No. 1,632,440 is intended to solve this problem. The router bit, however, is of conventional design and not only cleans the bottom of the groove but also cuts the side of the groove, because its cutting face or edge extends along the outer circumferential surface of the bit. As the friction collar of the bit wears, the bit begins to remove more of the side wall than necessary. This eventually leads to a loose or slopping fit of the mating parts.

Another type of cleaning bit for dado joints is illustrated in U.S. Pat. No. Des 269,348. Again, as with the 1,632,440 device, the bit has a cutting edge which is presented for engagement with the sidewalls of the dado channel.

U.S. Pat. No. 3,303,862 discloses a conventional cutting tool which presents an adjustable cutting blade that allows side contact in order to create a channel where a channel did not previously exist.

U.S. Pat. No. 4,168,730 discloses a complicated guide system working in conjunction with a bit of conventional design for the manufacture of dovetail joinery.

U.S. Pat. No. 4,412,571 discloses a one-step process using complicated guide systems to effect dado channels, mortises and grooves where no cuts previously existed. This tool claims to remove a substantial amount of material.

The cutting bit of U.S. Pat. No. 4,412,571 drives its blades off of the outer periphery of the cutting head, therefore creating a mechanical disadvantage from a standpoint of centrifugal leverage. In other words, the cutting surface is not close to the axis of rotation of the bit. The blades of this tool are only 1/16", and are claimed to be kept very sharp very easily. The tool is intended for use with a standard electric hand drill. The guide assemblies are also designed for use with an electric hand drill. All electric hand drills develop relatively low rpm, i.e., under 2500 rpm, which dictates and results in a very low blade-to-material ratio. This contrasts significantly with the present invention in which there is removal of substantial amounts of material.

The described depth guide of the tool bit of U.S. Pat. No. 4,412,571 has a larger inside diameter so as to form a ring that fits loosely around the main cutting member. This ring or depth guide is held securely in place by a set screw on one side so that the guide does not slip or move. At low rpm, any problem of imbalance due to the design of this depth ring would not be a significant factor. However, at high rpm, in excess of 4000 or 5000 rpm, any imbalance in the ring would set up oscillations in the tool which would render the tool uncontrollable.

All tool bits operating at high rpm must utilize special cutter blade materials. These materials are very difficult and somewhat costly to sharpen. Specialized equipment employing diamond grinding wheels are necessary to sharpen these various blade materials. The most commonly used material in high rpm blade technology is carbide.

A standard in the industry is to rate the cutter blade quality by carbide thickness. The professional grade blade possesses carbide which is over 1/16" in thickness. The commercial grade possesses carbide which is ⅛" in thickness. The industrial grade possesses carbide that is 3/16"+ in thickness. The cutter bodies of these blades are usually made of a material known as high speed steel with the carbide thickness then affixed to the high speed steel member.

High speed steel is also used for the entire construction of the common twist drill bit. The twist drill bit possesses no carbide because it is used generally in an electric hand drill. The common twist drill bit cannot safely exceed 3000 rpm without danger to its workpiece or its operator. Heat build-up, metal fatigue, crystallizing, and shattering of a high speed steel drill bit at high rpm is a common occurrence.

The cost of high speed steel is low since it is a moderately soft material. It is not cost effective to make low-speed, cutter blades from the more durable and expensive materials such as carbide. One of the advantages of cutter blades made of high speed steel is that they may be easily sharpened. The bit described in U.S. Pat. No. 4,412,571 is understood to be constructed of high speed steel and not carbide because it is designed with a guide system utilizing an electric hand drill. Thus the bit is not intended or designed to be used in high rpm technology.

Further, the device of U.S. Pat. No. 4,412,571 is intended to effect dado channels, mortises, and grooves where no cuts previously existed, i.e., to effect joint manufacture from start to finish in a one-step process. The present inventive bit is significantly different than the device of U.S. Pat. No. 4,412,571; they operate on very different principles.

There has been a long-standing problem with the existing devices or methods for creating perfect symmetry concerning the dimensions of the dado channel. There has been a long-felt need for a tool which would create such accuracy in perfecting the close dimensions of such a furniture joint. The present inventive tool bit solves the existing problems and obliges the demands of the industry.

SUMMARY OF THE INVENTION

The present inventive tool bit for operation in routers and laminate trimmers developing excess of 10,000 rpm provides an advanced design of a bit in which only the bottom surface of the cutting member removes material from the floor of a dado channel. However, this dado channel must have been previously cut in a workpiece. The outer circumferential surface of the cutting member utilizes the side wall of the previously cut channel as a guide for the path of the bit. The design of this bit enables this function to be possible because the cutting member presents no cutting edge for engagement with the side walls of the channel in the workpiece in any way.

In one embodiment of the present inventive tool bit, the cutting edge of the cutting member is made up of four separate cutting teeth spaced equidistant apart from each other and circumferentially close to the rotation axis of the tool bit. The teeth are set into notches in the solid, cylindrical body of the cutting member. The size of the teeth and their connection to the body member result in cooperation whereby the heat developed during operating of the bit is quickly dissipated allowing the bit to rotate at high rpm and still remove sufficient material from the floor of the channel.

While the discussion below refers to a dado channel, it should be understood that the inventive tool bit may be utilized to clean the floor of any perpendicularly adjoining surfaces.

BRIEF DESCRIPTION OF THE DRAWINGS

In order that the manner in which the above recited advantages and features of this invention are attained and can be understood in detail, a more particular description of the invention, briefly summarized above, may be had by reference to the specific embodiments thereof that are illustrated in the appended drawings, which drawings form a part of the specification.

DETAILED DESCRIPTION OF THE PREFERRED EMBODIMENT

Figure 1:
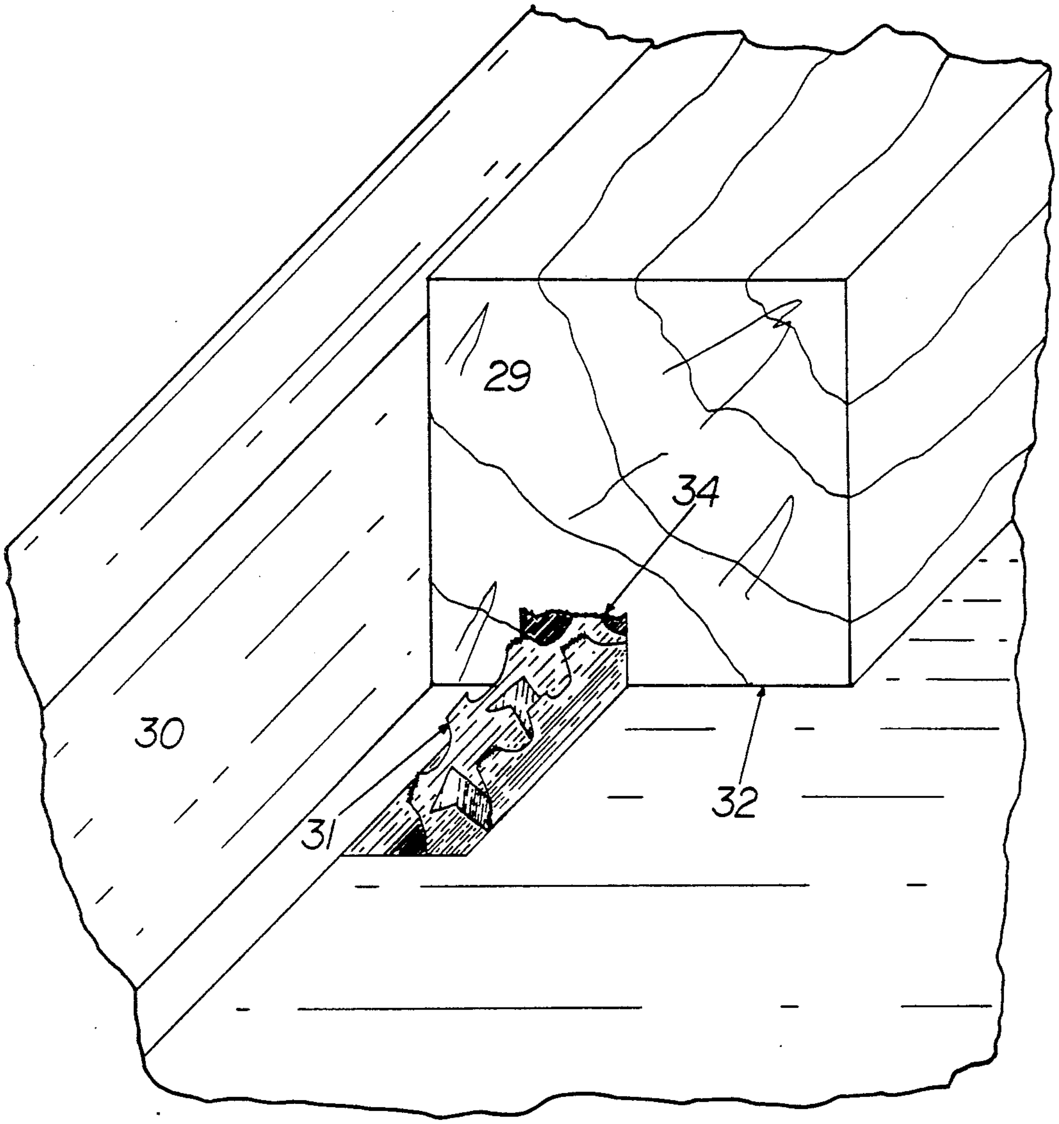
FIG. 1 PRIOR ART
FIG. 1 is a perspective view of the existing method of manufacturing a dado channel with a dado set of blades mounted in a table saw.

FIG. 1 illustrates a perspective view of a dado channel 34 being formed in wood member 29 by a dado blade set 31. Fence or guide 30 establishes the accurate location of the dado channel 34 as wood member 29 rests upon the table surface of table saw 32.

Figure 2:
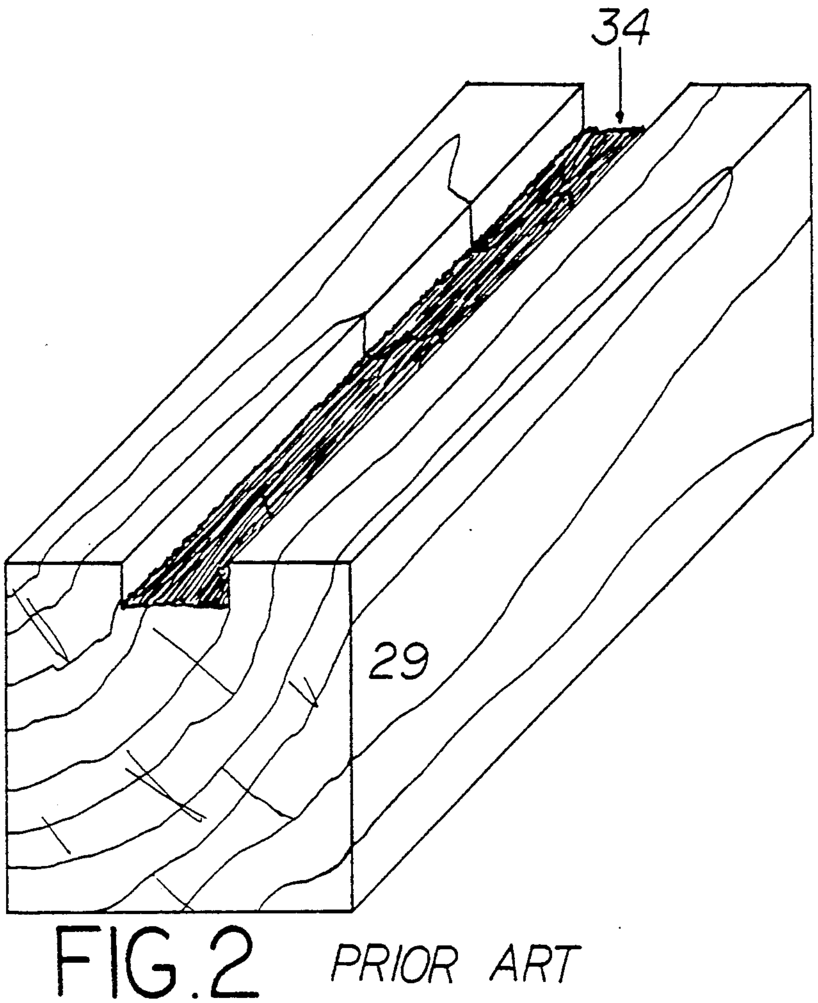
FIG.2 PRIOR ART
FIG. 2 is a perspective view of the dado channel cut in the solid wood member as a result of the method shown in FIG. 1.
Figure 3:
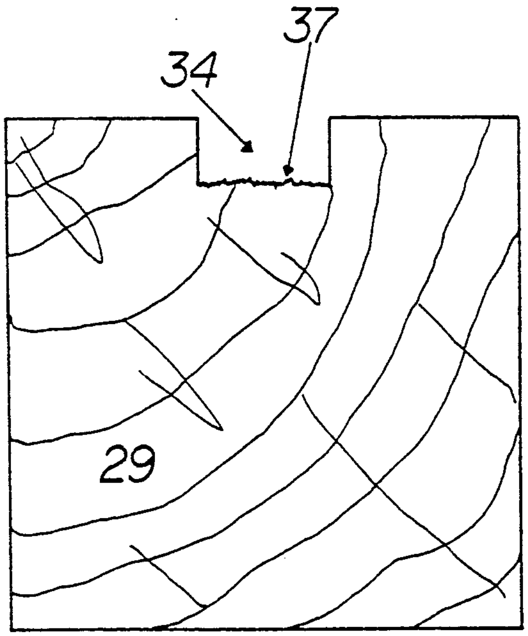
FIG.3 PRIOR ART
FIG. 3 is an end elevation of the solid wood member of FIG. 2 depicting the uneven floor of the dado channel.

FIG. 2 illustrates a perspective view of wood member 29 showing the uneven, rough and ragged dado channel 34 created as a result of the blade set 31. FIG. 3 is an end elevation view of wood member 29 depicting the uneven floor 37 of dado channel 34 formed by the typical blade set.

Figure 4:
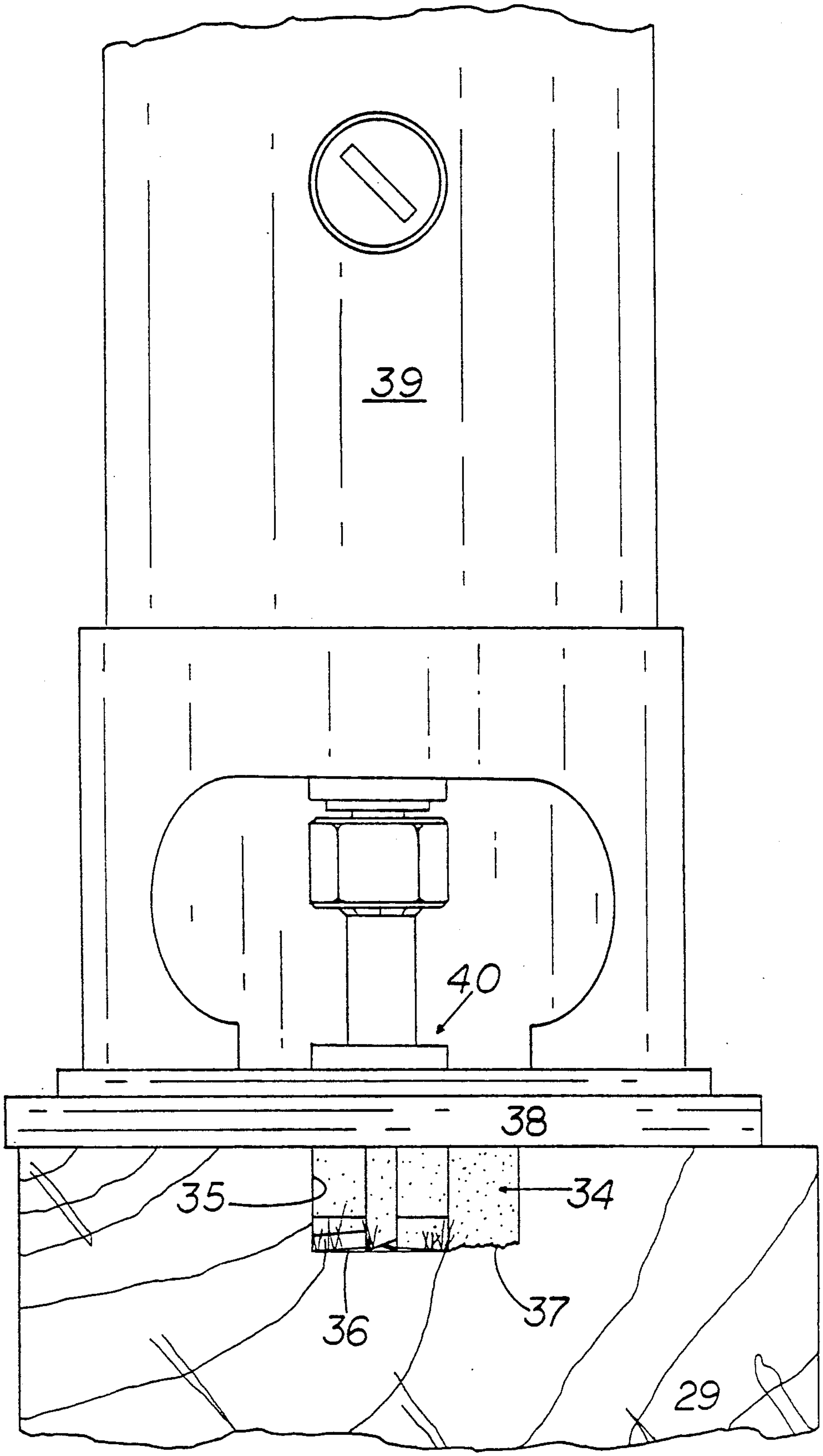
FIG. 4 is a side elevation of the present invention in operation finishing the uneven floor of a dado channel in a solid wood member being driven by a laminate trimmer at a velocity in excess of 28,000 rpm.

FIG. 4 illustrates a side elevation of wood member 29 and dado channel 34 with the present invention 40 using side wall 35 as a guide. Beneath the cutter blades depicts a smooth, even floor 36. Also shown existing in the dado channel is the uneven floor of the dado channel 37 which has not been acted upon by inventive bit 40. The depth of the present invention 40 is dictated by table 38 of the laminate trimmer 39.

Figure 5:
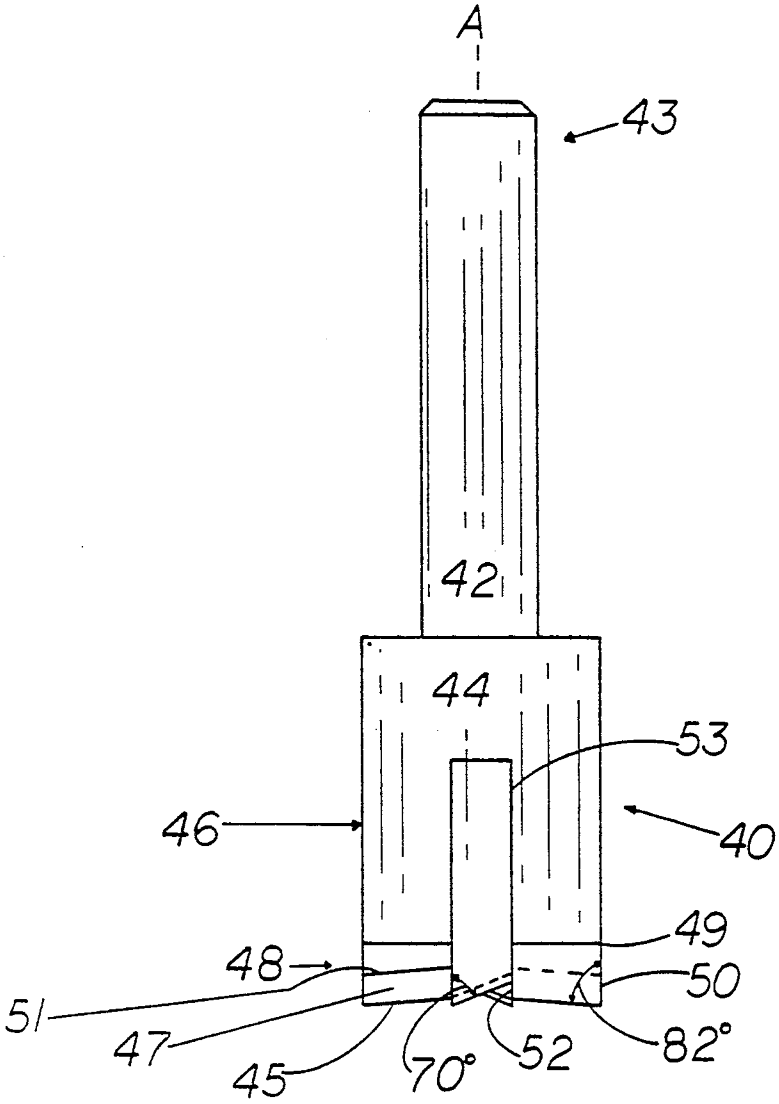
FIG. 5 is a side elevation of the present invention.

A side elevation plan view of the present inventive bit 40 is shown in FIG. 5. It may be noted that each of the teeth 48 has a leading cutting edge 45 and a cutting face 47 having an approximate 70° cutting angle. Further, each cutting tooth 48 has a slight cant in the range of 82° to 92° (preferably 82°) with the outer side 50 slightly longer than the inner side 52.

Along with the torque and speed of the driving motor, the slight cant on each of the teeth 48 creates a shearing action right up to the corner or intersection where the vertical sidewall of the dado intersects with the horizontal bottom or floor of the dado channel to ensure a complete cleaning of the channel without requiring a cutting edge on the outer circumferential surface of the bit as used in prior art devices.

The teeth 48 are circumferentially spaced apart, equidistantly from each other, close to the vertical rotation axis A of the bit 40.

It is envisioned that in the manufacture of the tool bit each tooth 48 will be silver soldered into notches 53 cut into the solid cylindrical body 44 of the bit 40. The outer circumferential surface 46 will be ground smooth with a diamond wheel so that no rough outer surface will be present.

Since most dado channels are between ¾" and 1" wide, the diameter of the cylindrical body 44 of the present inventive bit 40 would be approximately ½" wide (with dado channels ½" wide, the cylindrical body 44 would be approximately ⅜" wide). In a bit having a ½" wide body, each tooth would be approximately ⅛" wide from leading edge 45 to trailing edge 51 and 3/16" from inside edge 52 to the outside edge 50, and extend approximately ⅛" below the bottom end 49 of the body 44. The perpendicular distance from the midpoint of the inner edge of any tooth to the rotation axis is less than ⅛" to provide the maximum centrifugal leverage. In the ½" wide body this distance is 1/16". The same general proportions would be used on any size bit.

In use the bit is inserted into an electric hand router or small laminate trimmer having a high revolving speed in excess of 10,000 rpm. The depth setting is made by first securing the first end 43 of shank 42 of the bit 40 into the chuck, and second, by setting the standard table adjustment in such a way that the leading edge 45 of cutting teeth 48 contact the floor of the dado channel not to exceed the desired depth of the dado specification.

The removal of the uneven chips or fibers in the floor is easily completed by even the most inexperienced operator by simply running the rotating bit through the kerf of the dado or rabbet-type joint previously cut by a dado head (blade set) in a table saw or radial-arm saw. The operator uses the vertical side wall of the channel as the guide running the outer circumferential surface 46 of the cutter against the side wall. Thus the lateral guiding of the bit is accomplished below the top surface of the workpiece and above the floor of the dado channel.

The depth of the cutter is accomplished by utilizing the table of the driving motor which rests directly on the workpiece. This transfers the parallel condition of the workpiece surface to the bottom of the dado channel by means of the cutter blades of the present invention.

Figure 6:
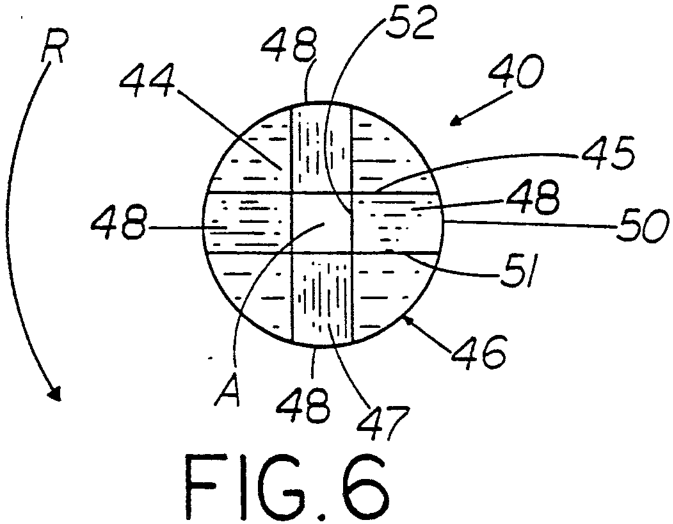
FIG. 6 is a bottom view of the present invention depicting the pattern of the cutter blades.

FIG. 6 illustrates a bottom view of the inventive bit 40. The spacing of the four teeth 48, equidistant from each other yet close to axis A should be noted. The bit 40 rotates counterclockwise in the direction of arrow R. The leading cutting edge 45 and the cutting face 47 of each tooth 48 may be seen in FIG. 6. The outer circumferential surface 46 of the bit 40 may be seen presenting no cutting edge or surface for engagement with the channel side walls.

Figure 7:
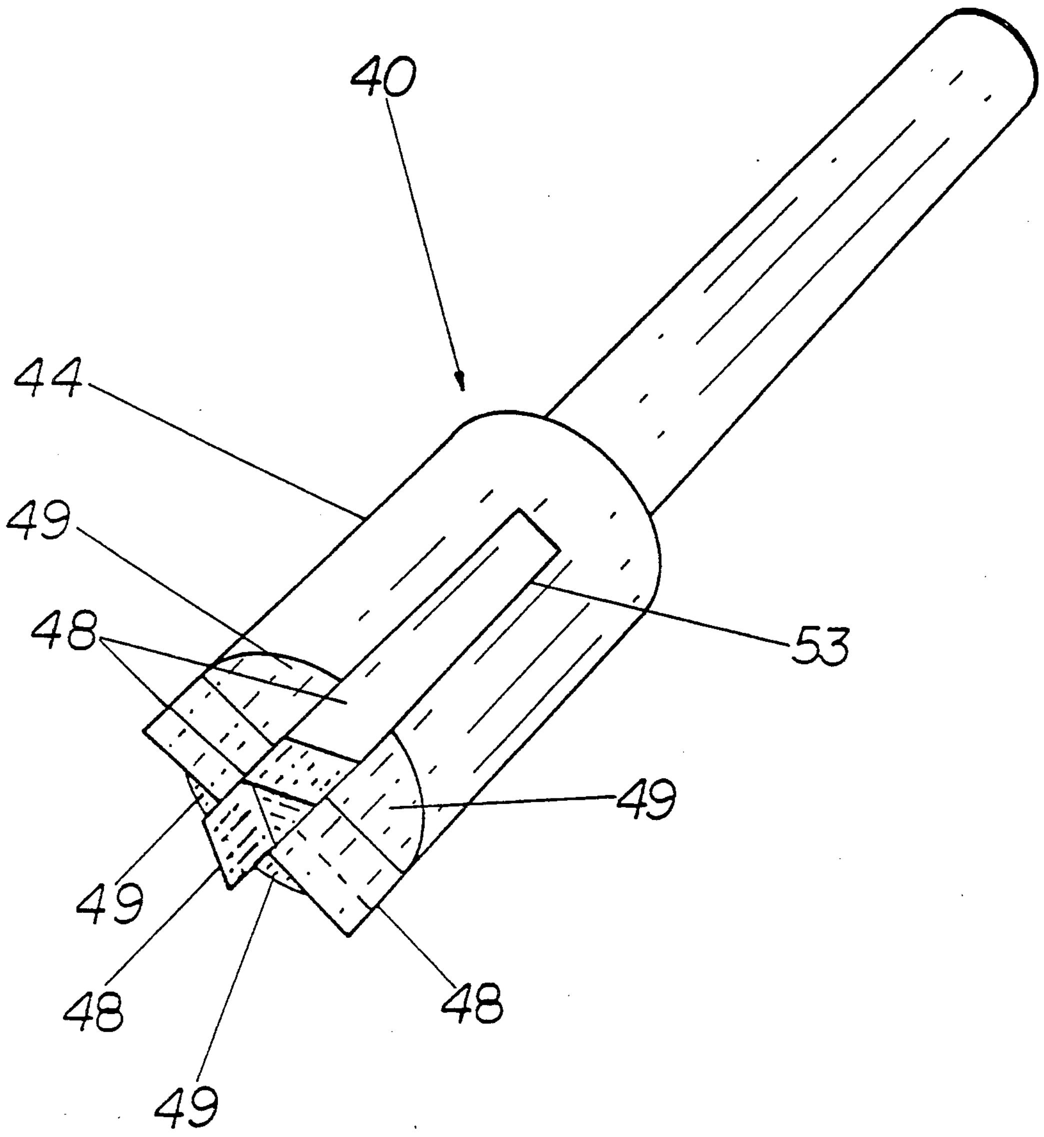
FIG. 7 is a perspective view of the present invention.

FIG. 7 illustrates a perspective view of one embodiment of the present inventive tool bit 40. The bit includes a shank 42 having a first end 43 for attachment to an electric hand router or small laminate trimmer, and a solid cylindrical body member 44 attached to the second end of the shank. Body member 44 is shown as having a smooth outer circumferential surface 46 which contacts the vertical side walls of a dado channel during operation serving as a guide directing the bit 40 in that path or direction it is to follow in the channel or groove.

Unlike most router bits, there is no cutting edge which is presented for engagement with the side walls of the channel. Since during operation the body member 44 is generally positioned beneath or below the top surface of the workpiece with surface 46 rotating against the channel side wall, the guiding of the bit 40 needs no external guiding assistance such as the guide fences well known in the art.

As may be further seen in FIG. 7, cutting member 44 has four separate cutting teeth 48, spaced apart circumferentially along the bottom end 49 of surface of body member 44.

At least 75% of the surface area of each tooth 48 or blade is mounted in slots or notches 53 in the solid, cylindrical body member 44. The means of affixing these teeth or blades 48 comprises silver solder or other media of high heat conductivity. The cooperation of the teeth 44 in heat transferring connection with the body member 44 serves as heat sink, release port, or as a heat transfer system for the exposed cutting area of the blade. As heat is built up in the cutting teeth during operation at high rpm, the heat is quickly and evenly dissipated through the teeth to the solid cylindrical body 44, allowing for continuous operation of the bit. The teeth 48 are comprised of carbide or other adequate metals or alloys concerning high rpm technology, and dependent on application of type of material to be cut.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I claim:

1. A tool bit for cleaning surface material from the bottom of a dado channel cut in a workpiece comprising:

a shank having a first end and a second end, said first end for securing to a power tool to provide high speed rotation of said shank about a given rotation axis, said second end having a cutting member for contact with said floor of said dado channel, said cutting member having a solid cylindrical body member and a cutting edge along only a bottom of said body member, said cutting edge further comprising a plurality of cutting teeth formed along the bottom of said body member, said teeth having cutting surfaces spaced equidistant from each other, each of said cutting surfaces having an inner edge circumferentially close to said axis of rotation and extending to an outer edge aligned with the outer circumferential surface of said cutting member, said teeth and said body member cooperating to dissipate the heat generated by high speed rotation of said bit during cleaning of said surface material from said cut, the entire surface of said outer circumferential surface of said cutting member presenting no cutting edge for engagement with side walls of said channel in said workpiece during said cleaning.

2. The tool bit of claim 1 wherein said cutting teeth further comprise a slight cant in the range of 82° to 92° from said inner edge to said outer edge of each of said teeth to impart a shearing force to said surface material during said cleaning.

3. The tool bit of claim 1 wherein at least 75% of the surface area of each of said teeth is in heat transferring contact with said body member to dissipate said generated heat during continuous operation of said bit.

4. The tool bit of claim 2 wherein the perpendicular distance from the midpoint of said inner edge of each of said teeth is less than ⅛" from said rotation axis.

5. The tool bit of claim 4 wherein said cutting teeth further comprise an approximate cutting angle of 7°.

6. The tool bit of claim 4 wherein the diameter of said body member is approximately ½" and each of said teeth is ⅛" wide by 3/16" long by ½" high with approximately ⅛" of said height extending below a bottom of said body and ⅜" of said height in heat transferring connection to corresponding notches in said body member.

* * * * *